(12) United States Patent
O'Bleness et al.

(10) Patent No.: US 8,688,919 B1
(45) Date of Patent: *Apr. 1, 2014

(54) METHOD AND APPARATUS FOR ASSOCIATING REQUESTS AND RESPONSES WITH IDENTIFICATION INFORMATION

(71) Applicant: Marvell International Ltd., Hamilton (BM)

(72) Inventors: R. Frank O'Bleness, Tempe, AZ (US); Sujat Jamil, Gilbert, AZ (US); David E. Miner, Chandler, AZ (US); Tom Hameenanttila, Phoenix, AZ (US); Jeffrey Kehl, Chandler, AZ (US); Richard Bryant, Chandler, AZ (US); Kim Schuttenberg, Gilbert, AZ (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,268

(22) Filed: Oct. 22, 2012

Related U.S. Application Data

(63) Continuation of application No. 12/537,857, filed on Aug. 7, 2009, now Pat. No. 8,296,525.

(60) Provisional application No. 61/089,320, filed on Aug. 15, 2008, provisional application No. 61/091,244, filed on Aug. 22, 2008, provisional application No. 61/091,269, filed on Aug. 22, 2008.

(51) Int. Cl.
*G06F 12/00* (2006.01)

(52) U.S. Cl.
USPC ............................... 711/146; 711/E21.001

(58) Field of Classification Search
None
See application file for complete search history.

(56) References Cited

U.S. PATENT DOCUMENTS

| | | | |
|---|---|---|---|
| 5,652,859 | A | 7/1997 | Mulla et al. |
| 5,748,938 | A | 5/1998 | Kahle |
| 6,810,464 | B1 | 10/2004 | Sipple et al. |
| 6,922,744 | B1 | 7/2005 | Sipple et al. |
| 6,986,003 | B1 | 1/2006 | Sipple et al. |

*Primary Examiner* — Kevin Verbrugge

(57) ABSTRACT

A system and method of tracking multiple non-identification tagged requests in a system with multiple responders using one or more tracking queues. In some embodiments, the system and method may be implemented in a snoop filter covering multiple caches. In some embodiments, a data-less bus query may be used to update the status of a requested line.

20 Claims, 6 Drawing Sheets

METHOD AND APPARATUS FOR ASSOCIATING REQUESTS AND RESPONSES WITH IDENTIFICATION INFORMATION

CROSS REFERENCE TO RELATED APPLICATIONS

This disclosure is a continuation of U.S. application Ser. No. 12/537,857 filed on Aug. 7, 2009, now U.S. Pat. No. 8,296,525 which claims priority under 35 U.S.C. §119(e) from U.S. Provisional Application Ser. No. 61/089,320, filed Aug. 15, 2008, entitled METHOD AND APPARATUS FOR DATA-LESS BUS QUERY; from U.S. provisional patent application Ser. No. 61/091,244, entitled METHOD FOR ASSOCIATING SNOOP REQUEST AND SNOOP RESPONSES WITH TRANSACTION ID AND ROUTING INFORMATION IN A COHERENT MEMORY SYSTEM, filed Aug. 22, 2008; and from U.S. provisional patent application Ser. No. 61/091,269, filed Aug. 22, 2008, entitled OPTIMIZED SNOOP REQUEST TRACKING FOR COHERENT MEMORY SYSTEMS WITH VARIABLE LATENCY, which are all incorporated herein by reference in their entirety.

FIELD

Aspects of the present invention relate generally to the field of cache architectures and more particularly to cache coherency design and cache snooping.

DESCRIPTION OF THE RELATED ART

A snoop request can be used to determine if a requested line already exists in an on-chip cache to avoid fetching the line from memory. A snoop filter may be implemented to help lessen the traffic to the cache(s) and improve memory performance. A snoop filter also may track the contents of the cache in order to avoid needlessly consuming cache bandwidth with requests for non-cached lines. In a multi-cache system, the first-level of cache accessed (e.g., the lowest level) by system instructions is generally the most sensitive to bandwidth concerns. A system snoop request of a lower-level cache may therefore utilize performance critical bandwidth when the cache is close to the instruction flow. Furthermore, although snoop requests successfully resolved by the snoop filter may require only minimal action at the associated cache(s), unresolved snoop requests are treated as a miss, and are then resolved by snooping the cache(s) associated with the respective snoop filter.

Coherence policies are typically used to track the state or 'coherent status' of lines in a cache. If the status of the cached line is known in the filter, whether clean or dirty, the filter may return a more meaningful response to the snoop request. One type of cache coherence protocol that may be implemented to track the status of the line in the cache is the Modified-Exclusive-Shared-Invalid (MESI) cache coherence protocol. Under the MESI protocol, a line is dirty if the line is modified. A line is clean if the line is exclusive or shared. Accessing a line in the system memory that is additionally in the cache, where the coherence state of the line in the cache is dirty because the line is shared or modified, may result in use of a stale line. Therefore, it is important to accurately maintain the coherence status of the cached lines so that dirty lines are not accessed in the system memory until they are written from the cache. While the MESI protocol is used here as an example, any other cache coherence protocol or model may be effectively implemented.

Efficiently maintaining coherence status in the snoop filter is not always easily accomplished. Traditional bus protocols do not often provide commands that may be used to manage coherence states. A read/write command is often used for cache coherency and cache management, but such commands take up unnecessary instruction bandwidth and are therefore inefficient and generally undesirable in many circumstances. Alternatively, most bus architectures provide a readonce command. The readonce acts as a latent read command that may be used to acquire a copy of a line without altering the state of the line. However, the readonce command consumes unnecessary data bandwidth by returning a copy of the read line. A more efficient method for updating the cache coherence may be desirable in some instances.

In multi-cache systems, a filter implemented with a cache coherency protocol may decrease the response time for snoop requests. However, if the snoop requests do not have identification tags, the filter can only respond to one request at a time. Therefore response time increases as the number of requests waiting for a response increases. The delay may be further exacerbated in a system having multiple requesting agents. Therefore, it may be desirable in some circumstances to implement a method and a system for handling multiple, simultaneous, non-tagged requests.

SUMMARY

A system and method of tracking multiple non-identification tagged requests in a system with multiple responders using one or more tracking queues. In some embodiments, the system and method may be implemented in a snoop filter covering multiple caches. In a multi-responder system, upon interception of a request, information about the request may be entered into a queue and forwarded to the appropriate responder(s). Upon receipt of a sufficient response to the request, the request may be removed from the queue and returned to the requestor. In some embodiments, a queue may be implemented for each individual responder such that multiple responders may process different requests according to the bandwidth of each responder. In some embodiments, a data-less bus query may be used to update the status of a requested line.

BRIEF DESCRIPTION OF THE DRAWINGS

The foregoing and other aspects of various embodiments of the present invention will be apparent through examination of the following detailed description thereof in conjunction with the accompanying drawings in which similar reference numbers are used to indicate functionally similar elements.

DETAILED DESCRIPTION

Figure 1:
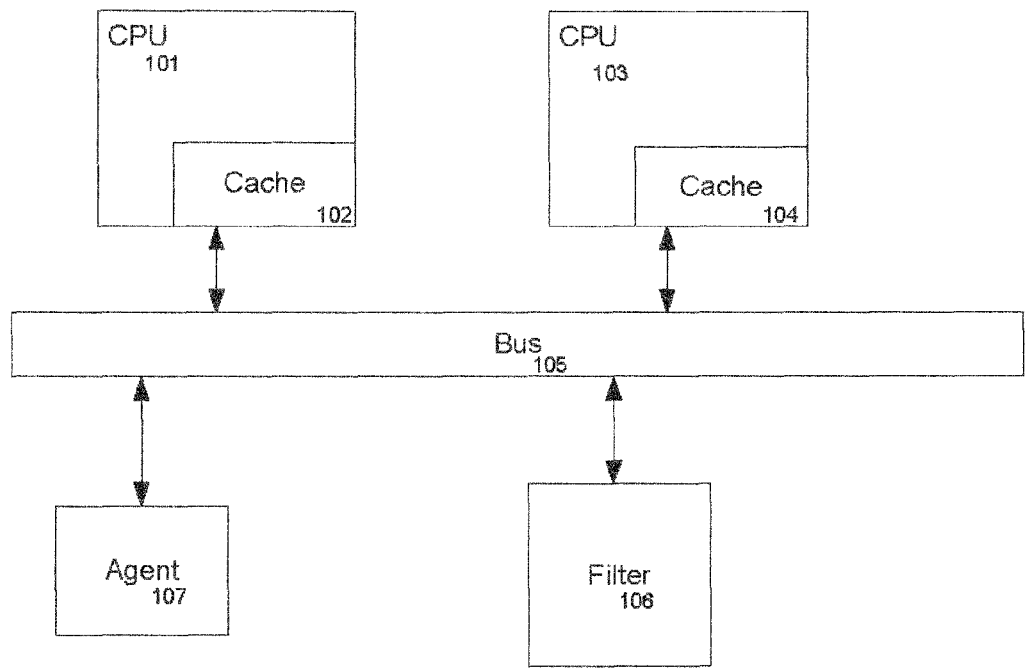
FIG. 1 is a simplified block diagram illustrating components of one embodiment of a multi-cache system.

FIG. 1 is a simplified block diagram illustrating components of one embodiment of a multi-cache system. A multi cache system may include multiple CPU s. As shown, CPU 101 and CPU 103 are each associated with a cache, cache 102 and cache 104 respectively. Agent 107 may be any device seeking to read data from the any memory device or responder in the system. CPU 101, CPU 103, and agent 107 may communicate via bus interface 105. Agent 107 may issue a read request on bus interface 105. A read request from agent 107 may be issued serially to each cache (e.g., 102 and 104) or broadcast to all caches in the system. If no line is returned, or the request to the cache returns a miss, agent 107 may issue a read request to obtain the line from the main memory (generally assumed to the memory space that is cacheable in CPU 101 and 103). Rather than sending every snoop request to both cache 102 and cache 104, snoop filter 106 may be implemented to reduce snoop traffic. Agent 107 may not be aware of snoop filter 106. Snoop filter 106 may intercept read requests issued on bus interface 105 and direct the read request to the best location of the line, whether in cache or main memory such that the requested lines are returned to agent 107. Alternatively, snoop filter 106 may return to agent 107 the best location of the requested line, therefore allowing agent 107 to directly read the desired line, whether from an associated cache or from a system's main memory.

Figure 3:
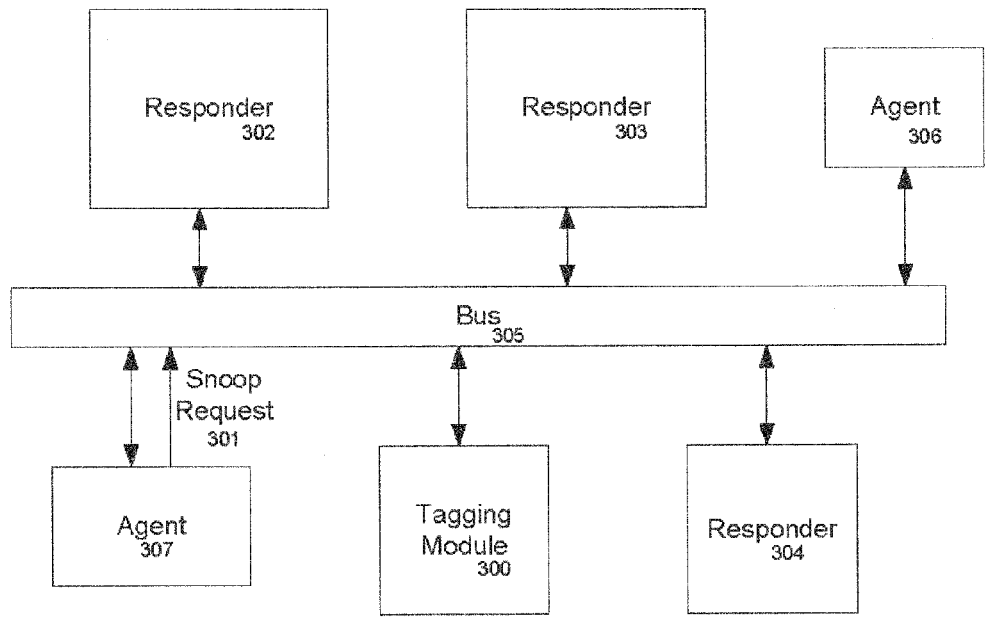
FIG. 3 is a simplified block diagram illustrating components of one embodiment of a multi-cache system with a request-tracking module.

FIG. 3 is a simplified block diagram illustrating components of one embodiment of a multi-cache system with a request tagging module. Responders 302, 303 and 304, agents 306 and 307, and request tagging module 300 may be coupled via bus interface 305. Responders 302, 303, and 304 may be any devices that can receive and resolve snoop requests. A snoop request may be resolved with either a cache hit, in which the requested line is in the cache, or a cache miss, in which the requested line is not in the cache. Agents 306 and 307 may be any devices that can issue snoop requests. Each snoop request 301 sent to bus interface 305 may be intercepted by request tagging module 300.

In a system having multiple agents and multiple responders, multiple snoop requests may be handled at substantially the same time by implementing request identification tagging. In identification tagging, each snoop request (e.g., snoop request 301) is tagged with a unique ID such that each snoop response received contains the unique ID of an associated snoop request, and the snoop response can be routed to the correct requesting agent (e.g., 306 or 307). With identification tagging, snoop requests may be handled in any order. However, some agents or responders may not support identification tagging. Without identification tagging, snoop requests are handled in the order in which they are received by the responder, and therefore only one snoop request may be executed at a time.

To avoid performing snoop requests one at a time, request tracking may be used. Request tagging module 300 may handle multiple snoop requests substantially simultaneously even if agents 306 and 307 and responders 302, 303, and 304 may not have any awareness of routing and tagging information.

Figure 4:
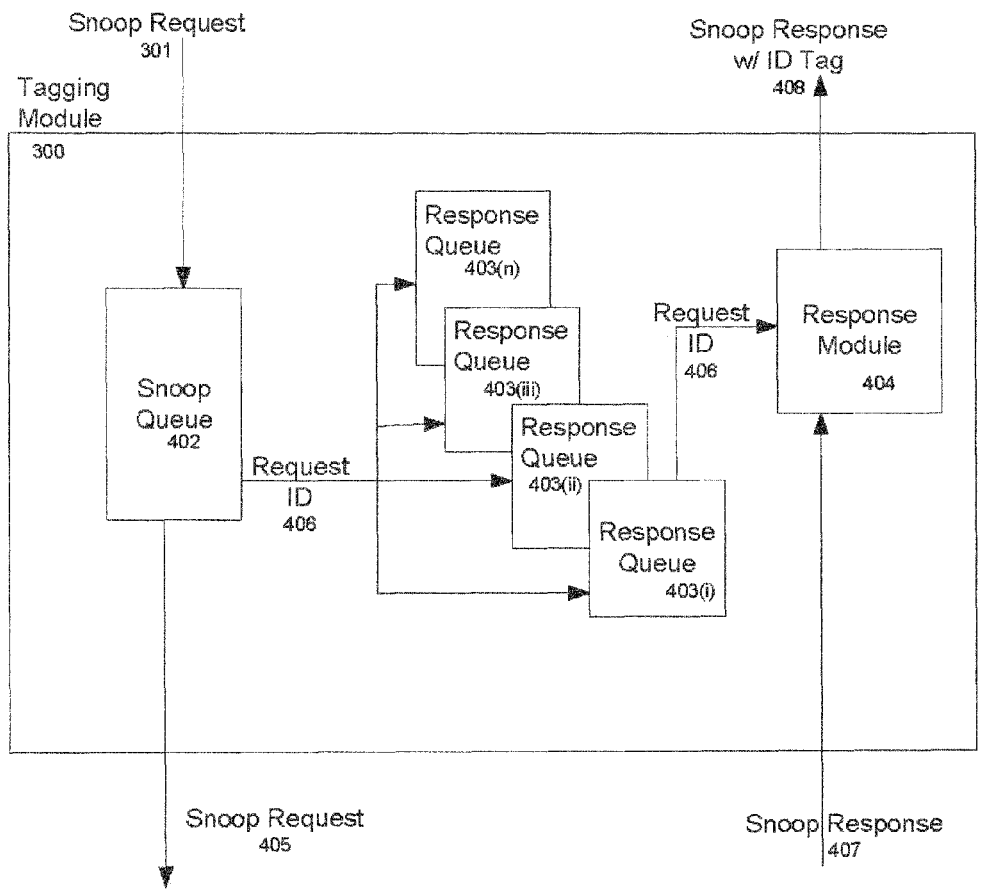
FIG. 4 is a simplified block diagram illustrating the components of one embodiment of a request-tracking module.

FIG. 4 is a simplified block diagram illustrating the components of one embodiment of request tagging module 300. Request tagging module 300 may generally comprise snoop queue 402, response queues 403(i)-403(n), one response queue for each associated responder, and response module 404. Each queue may be a first-in-first-out (FIFO) queue with a head and a tail. Items may be added at the tail of the queue and popped from the head of the queue. As is generally understood, the term 'popped' as used herein means retrieving an item from the head of a queue and removing the item from the queue.

An input snoop request 301 may be entered into snoop queue 402. Snoop queue 402 may hold snoop requests that have been initiated by an agent and intercepted on bus interface 305 but have not yet been transmitted to a responder. Snoop request 301 maybe separated into two parts, the snoop request 405, and the snoop request ID and routing information 406. If the requesting agent does not use identification tagging, or snoop request 301 does not have snoop request ID information 406, request tagging module 300 will assign a unique identifier. Snoop request 405 may then be sent to each potential responder, and snoop request ID information 406 may be entered into response queues 403(i)-403(n) associated with each responder to which snoop request 405 was sent. Once entered into response queue 403, snoop request 301 may be popped from snoop queue 402.

Each responder may handle snoop requests in the order in which they were received. Upon resolution of snoop request 405, a responder may return snoop response 407 to response module 404. Response module 404 may then pop snoop request ID information 406 from the head of response queue 403 associated with the responder. Response module 404 may then combine snoop request ID information 406 with snoop response 407 to create complete snoop response with identification tagging 408. Complete snoop response 408 may be returned to the requesting agent.

In one embodiment, each device 302, 303, 304, 306 and 307 may act as both agent and responder. To avoid unnecessarily snooping the requesting device, a snoop mask may be implemented in request tagging module 300. A snoop mask may contain a reference to each responder to which a snoop request should not be sent. The mask may include the requesting device, or any other responder that request tagging module 300 does not need to snoop for the requested line. With the implementation of a snoop mask, snoop request 405 may be sent to only a subset of the available responders and therefore snoop request ID information 406 may be added only to response queues 403(i)-403(n) associated with that subset of responders.

In one embodiment, a single response queue 403 may be implemented. To pop snoop request ID information 406 from single response queue 403, snoop response 407 must be received from each responder to which snoop request 405 was sent. The time to return complete snoop response 408 using single response queue 403 would be at least the response time for the slowest responder.

In one embodiment, additional queues may be implemented to track additional information. For example, if coherency information is requested separately from snoop request 301, such information may be stored in a separate set of coherency queues. When response module 404 receives snoop response 407, state information associated with snoop response 407 may be stored for later retrieval in a separate coherency queue associated with the responder. Then if the state information is requested, tracking module 300 may return the state information stored in the coherency queue without forwarding the request to the responder and waiting for a reply.

In one embodiment, a single informational queue may be implemented with a single entry for each snoop request 301, such that each subsequently implemented queue may contain simple pointers to the relevant request in the informational queue to preserve space and prevent unnecessary duplication.

Figure 6:
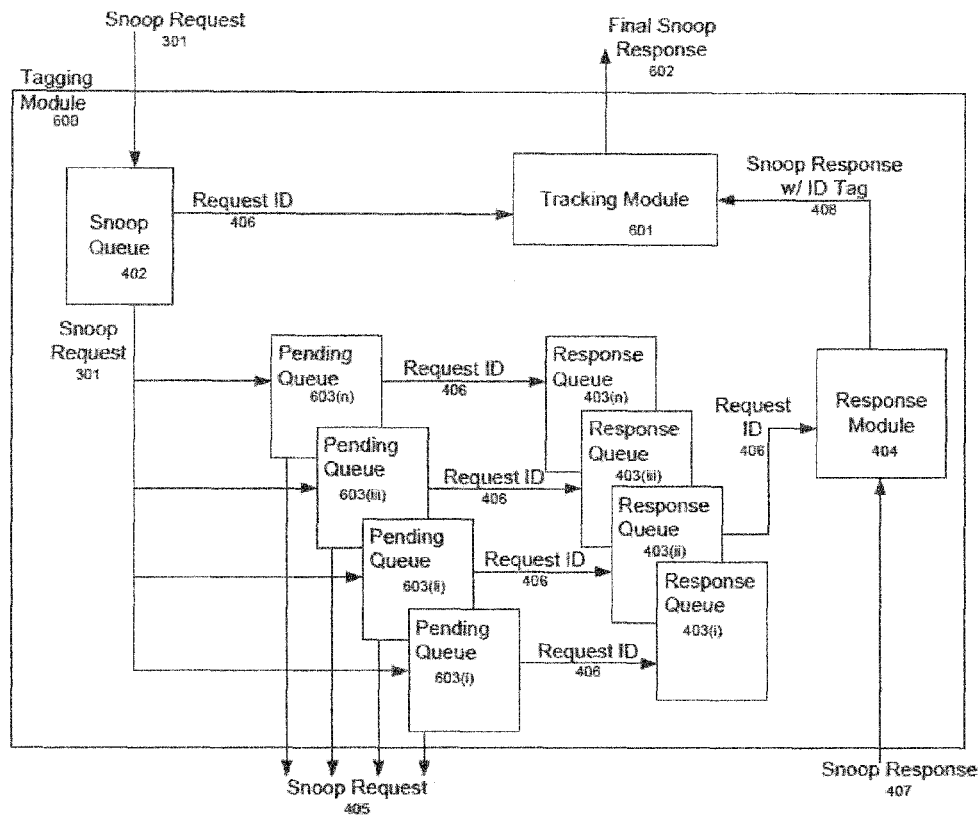
FIG. 6 is a simplified block diagram illustrating the components of one embodiment of a request-tracking module with a tracking structure.

FIG. 6 is a simplified block diagram illustrating the components of one embodiment of a request-tracking module with a tracking structure. Request tagging module 600 may enter input snoop request 301 into snoop queue 402. Snoop request ID information 406 may be input into tracking module 601. Tracking module 601 may be implemented to include a single entry for every snoop request 301, and hold all received responses associated with snoop request ID information 406. In some implementations, tracking module 601 may be implemented in hardware and may be embodied in or comprise, e.g., a buffer or other hardware memory structure. Additionally or alternatively, tracking module 601 may comprise data structures, software, or other hardware-executable instruction sets.

If responders are unable to manage more than one request at a time, and are available to process requests at different times, a set of pending queues 603(i)-603(n) may be implemented to hold pending snoop requests. Each responder may be associated with a pending queue 603. Snoop request 301 may be input into pending queue 603 for each responder to which snoop request 301 may be sent. Snoop request 301 may then be popped from snoop queue 402.

When a responder is available to process a snoop request, the next snoop request 301 may be popped from the associated pending queue 603, snoop request 405 may be sent to the responder, and snoop request ID information 406 may be entered into response queue 403 associated with that responder. When snoop response 407 is received at response module 404, snoop request ID information 406 may be popped from response queue 403 associated with the responder that sent snoop response 407. Response module 404 may combine snoop response 407 with snoop request ID information 406 and send complete snoop response with ID tag 408 to tracking module 601.

Tracking module 601 may store complete snoop response 408 with the single entry of request ID 406 previously entered into tracking module 601. Once a threshold number of snoop responses has been returned to tracking module 601, tracking module 601 may trigger actions required by a coherency protocol implemented in the system. A threshold number of snoop responses may be indicated upon receipt of a request response 407 from a majority of responders to which snoop request 405 was sent. The threshold number of snoop responses may be a count of the snoop responses received substantially equal to a majority of devices sent snoop request 405. Additionally, tracking module 601 may hold the cache miss responses until either a clean cache hit is received or sufficient misses have been received to confirm the miss status. Tracking module 601 may then return final snoop response 602 to the requesting agent.

Figure 2:
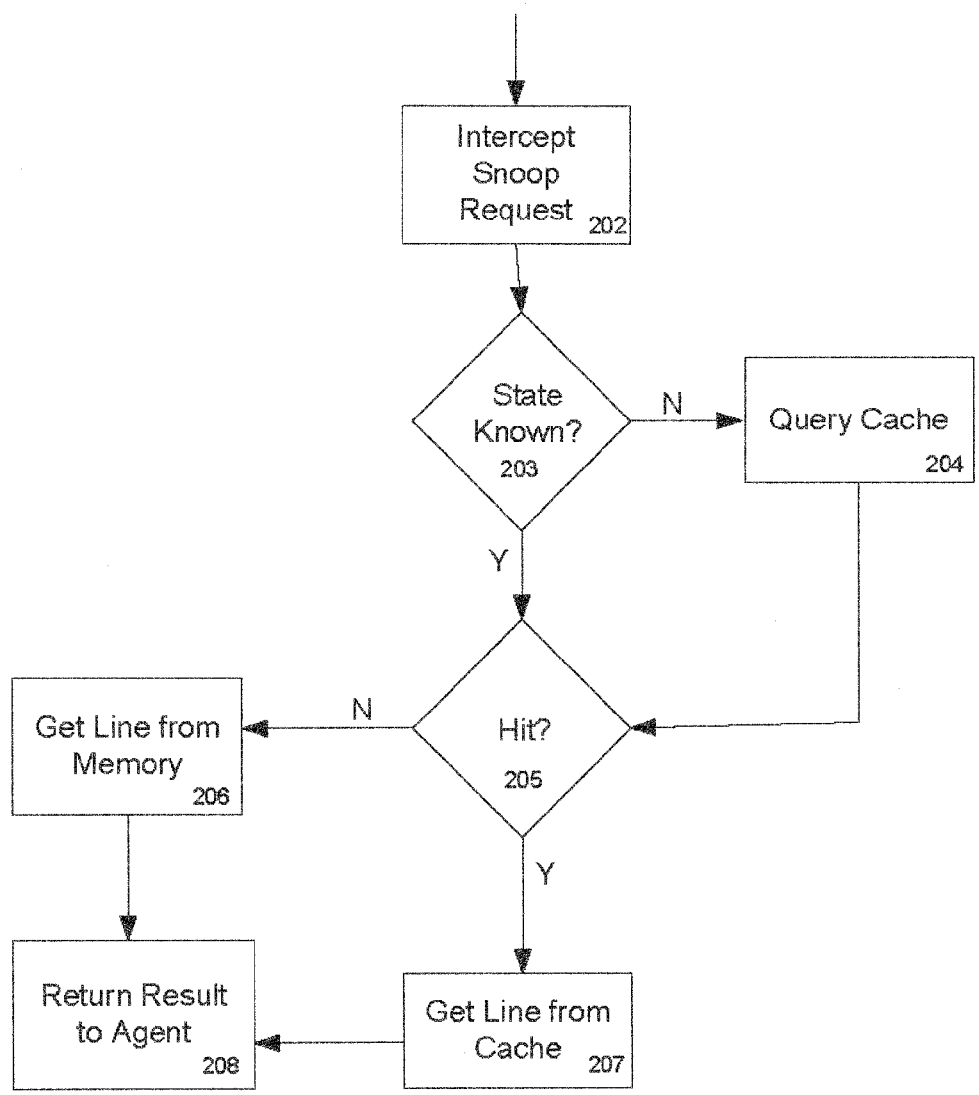
FIG. 2 is a simplified flow diagram illustrating general operation of one embodiment of a method for responding to a read command using a snoop filter.

FIG. 2 is a simplified flow diagram illustrating general operation of one embodiment of a method for responding to a read command using a snoop filter. At block 202, a read command may be intercepted. A determination may then be made whether the requested line can be read from an associated cache. At decision block 203, a determination may be made regarding whether the line in the cache, whether clean or not, is known. If yes, then the method continues to decision block 205. If the state of the line in the cache is not known, at block 204, the cache may be queried to determine the updated state of the line, then the method proceeds to decision block 205. If at block 204 the relevant cache is queried to determine the state of the line, and a read or readonce command is used, the line is returned with the response. If the state of the returned line is not clean, a clean version of the line may be retrieved from the CPU's main memory. Therefore, the line returned with the query is a waste of bandwidth.

At decision block 205, a determination may be made regarding whether the line is in the cache. If the line is in the cache, i.e. a cache hit, the line may be read from the cache at block 207. If the line is not in the cache, i.e. a cache miss, the line may be retrieved from the system main memory at block 206. At block 208, the line may be returned to the requesting agent. If the agent requests the best location of the line rather than a read of the line, the location of the line, whether in a specific cache or system memory, may be returned to the agent at block 208 rather than the line itself, and blocks 206 and 207 may be skipped. The agent may then read the line from the returned location. Any lines returned at block 204 during the cache query would additionally be a waste of bandwidth if the agent reads the line from its clean location.

To avoid wasting bandwidth with unnecessary read commands, a coherence protocol may be implemented as part of a snoop filter such that the snoop filter may return the correct status and cache location of the requested line without needing to query the cache for the state of the requested line. The update of snoop filter coherence states may be aided with the use of a data-less bus query. A data-less bus query may be implemented similar to a readonce command, but without returning a copy of the read line. As previously noted, a readonce command acts as a latent read command that may be used to acquire a copy of a line from a memory system without altering the state of the line in the memory system. A memory system may be any type of storage device capable of maintaining data and the status of that data, for example, random access memory or flash memory. However, the readonce command consumes unnecessary data bandwidth by returning a copy of the read line. In context of a snoop filter, the data less bus query may be issued by the snoop filter to update the applicable coherence status of the addressed line in the related cache(s).

A data-less bus query command may eliminate the inefficiencies associated with using a read/write command or a readonce command to maintain coherence. A data-less bus query may be issued either upon receipt of a line request or on an opportunistic basis. Issuing a data-less bus query opportunistically, e.g., when the bus interface is not otherwise engaged, may lessen the impact the query has on the system bandwidth. Although the data-less bus query is illustrated in the context of managing a coherence policy as part of a snoop filter, other uses of the command may be apparent to one skilled in the art.

Figure 5:
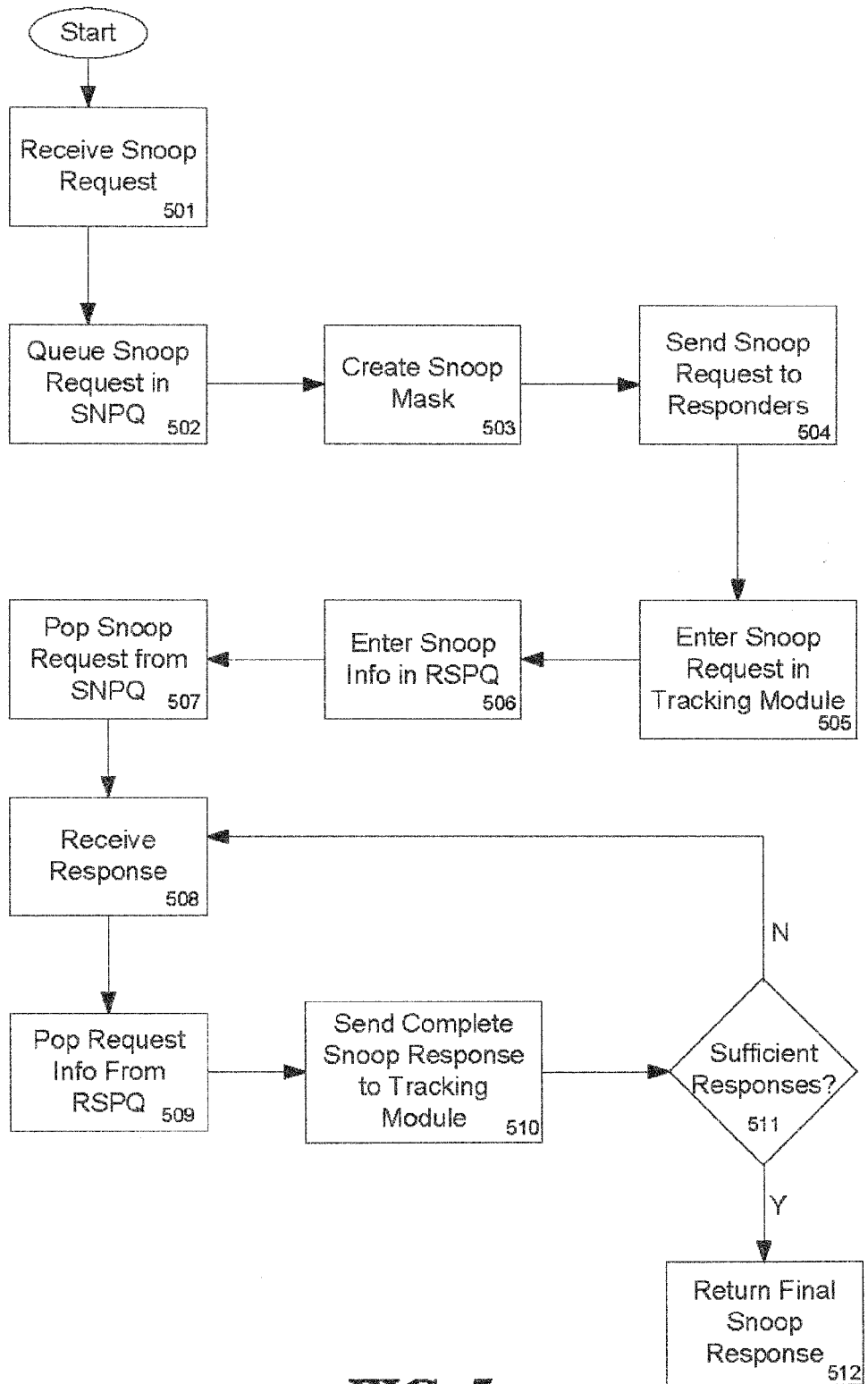
FIG. 5 is a simplified flow diagram illustrating general operation of one embodiment of a method for tracking snoop requests in a system with variable latency.

FIG. 5 is a simplified flow diagram illustrating general operation of one embodiment of a method for tracking snoop requests in a system with variable latency. A snoop request may first be received at block 501. Upon receipt, the snoop request may be queued in a snoop queue (SNPQ) at block 502. At block 503, a snoop mask may be created so that snoop requests are not sent to every responder. For example, if a requesting agent may also act as a responder, snooping the requester may be undesirable.

At block 504, the snoop request may be sent to the responders not part of a snoop mask created at block 503. Where a responder is unable to handle more than one snoop request at a time, and each destination responder has different latencies such that each responder may be available at different times, a pending queue may be implemented to hold pending requests for each responder. In that regard, a next snoop request may be popped from the pending queue and sent to a responder when it is available to receive such a request. The snoop request may also be entered into a tracking module at block 505. A tracking module may be implemented to hold the snoop responses until a definitive response has been received, or until a threshold number of responders have completed the snoop request and sent snoop responses. As indicated above, a threshold number of responders may be substantially equal to a majority of responders sent the snoop request.

In association with a snoop request being sent to a responder, the snoop request identification information may be entered into the response queue (RSPQ) associated with that responder at block 506. Once the snoop request has been sent to all relevant pending queues or response queues, the snoop request may be popped from the snoop queue at block 507. The next incoming snoop request received at block 501 and similarly queued at block 502. The request may be in the form of a data-less bus query command, a readonce command, or a read command. Depending on the command used in the request, the response may be a line or the coherence state of a line.

Upon receipt of a snoop response from a responder at block 508, the snoop request information may be popped from the response queue associated with that responder at block 509. The snoop response may be associated with the snoop request information and may be sent to the tracking module at block 510. If at decision block 511 there are sufficient responses in the tracking module associated with the snoop request to return a definitive snoop response to the requesting agent, a final snoop response may be sent to the requesting agent at block 512. If at decision block 511 there are not sufficient responses associated with the snoop request in the tracking module, the system may continue to wait for additional responses from the responders.

It is noted that the arrangement of the blocks in FIG. 2 and FIG. 5 does not necessarily imply a particular order or sequence of events, nor is it intended to exclude other possibilities. For example, the operations depicted at 504, 505 and 506 may occur in an alternate order or substantially simultaneously with each other; similarly, the operations depicted at 503, 505 or 511 may be eliminated in some instances.

Although the use of queues to handle multiple non-tagged requests substantially simultaneously has been described in reference to a snoop filter in a multi-cache system, it will be apparent to one of ordinary skill in the art that the request tracking herein described may be applicable to any ordered requests lacking identification tagging in a multiple responder or multiple agent system.

While the invention has been described in detail above with reference to some embodiments, variations within the scope of the invention will be apparent to those of ordinary skill in the art. Thus, the invention should be considered as limited only by the scope of the appended claims.

What is claimed is:

1. A method comprising:
   in response to receiving a request from a requestor, entering identification information for the request into a first queue;
   forwarding the request to a device capable of resolving the request;
   upon receipt of a response from the device, associating the identification information in the first queue with the response; and
   selectively repeating said forwarding, and said associating for additional requests.

2. The method of claim 1, further comprising:
   for an iteration of said forwarding and said associating, creating an additional queue for each additional device; and
   entering the associated identification information into the additional queue;
   wherein the first queue is associated with a first device, and each of the additional queues are associated with one of the additional devices, and said forwarding the request to the first device and said forwarding the request to one of the additional devices occur at the same time or at different times.

3. The method of claim 1, further comprising:
   entering the response and the associated identification information into a tracking module; and
   upon entering a threshold response and associated identification information into the tracking module, selecting a particular response from the tracking module to return to the requestor.

4. The method of claim 3, wherein the threshold response is based at least on a count of the responses received.

5. The method of claim 4, wherein the threshold response is determined by information associated with the response received from the device.

6. The method of claim 1, further comprising creating a mask, wherein the mask covers devices capable of resolving the request that will not be sent the request.

7. The method of claim 1, further comprising entering identification information into a data queue, wherein entering the identification information into the first queue comprises entering pointers to the identification information in the data queue.

8. The method of claim 1, further comprising entering information related to the request, information related to the response, or both the information related to the request and the information related to the response into an informational queue.

9. The method of claim 1, further comprising:
   before said forwarding the request to the device, entering the request into a pending queue associated with the device in response to the device being temporarily unable to receive the request; and
   retrieving the request from the pending queue and forwarding the request to the device when the device is ready to handle the request.

10. The method of claim 1, wherein the request uses a data-less bus query.

11. An electronic memory system comprising:
   a memory configured to implement a first queue to store identification information for a request received from a requestor; and
   a response module to associate a response received from a device capable of resolving the request with the identification information in the first queue, wherein the response module is configured to combine the response and the identification information into a complete response and return the complete response to the requestor.

12. The electronic memory system of claim 11, further comprising:
   a plurality of queues wherein each queue is associated with a different device from a plurality of devices that is configured to resolve requests; and
   wherein the response module is configured to store the identification information from received requests into the queue associated with the device to which the received request is sent to for being resolved.

13. The electronic memory system of claim 11, further comprising:
   a tracking module to store the response and the associated identification information; wherein when a threshold response and associated identification information is entered into the tracking module, the tracking module selects a stored response to return to the requestor.

14. The electronic memory system of claim 13, wherein the threshold response is based at least on a count of the responses received.

15. The electronic memory system of claim 13, wherein the threshold response is determined by information associated with the response from the device that resolves the request.

16. The electronic memory system of claim 11, further comprising a mask module to create a mask, wherein the mask covers devices capable of resolving the request that will not receive the request.

17. The electronic memory system of claim 11, further comprising a data queue, wherein the data queue stores identification information, and the first queue stores pointers to the identification information in the data queue.

18. The electronic memory system of claim 11, further comprising an information queue for storing information related to the request, information related to the response, or both the information related to the request and the information related to the response.

19. The electronic memory system of claim 11, further comprising:
- a pending queue associated with the device, the pending queue to store the request in response to the device being temporarily unable to receive the request; and
- wherein the request is retrieved from the pending queue and sent to the device when the device is ready to handle the request.

20. The electronic memory system of claim 11, wherein the request is a memory request or a snoop request.

* * * * *